March 16, 1937. J. SNEED Re. 20,299

BRAKE MECHANISM

Original Filed March 15, 1928 2 Sheets-Sheet 1

INVENTOR
JOHN SNEED
BY Louis A. Helmuth
ATTORNEY

March 16, 1937. J. SNEED Re. 20,299

BRAKE MECHANISM

Original Filed March 15, 1928 2 Sheets-Sheet 2

INVENTOR
JOHN SNEED
BY
Louis W. Helmuth
ATTORNEY

Reissued Mar. 16, 1937

Re. 20,299

UNITED STATES PATENT OFFICE 20,299

BRAKE MECHANISM

John Sneed, Grosse Pointe Shores, Mich., assignor to The Midland Steel Products Company, Cleveland, Ohio, a corporation of Ohio Original No. 1,857,481, dated May 10, 1932, Serial No. 261,761, March 15, 1928. Application for reissue April 19, 1934, Serial No. 721,383

24 Claims. (Cl. 188—78)

This invention relates to brakes and is illustrated as the type of brake suitable for use on a motor vehicle. The invention has to do particularly with means for causing engagement between the brake shoe and the brake drum.

In internal expanding brakes it has been common practice to expand the shoe or other friction device by means of a cam positioned between adjacent ends of the shoe, and it has been found expedient in many instances to permit the cam to float bodily with the ends of the shoe to maintain an expanding force while the brake is being applied. One skilled in the art knows that this result has been accomplished in numerous instances either by allowing the cam shaft to shift or by permitting the cam to shift with relation to the cam shaft. Floating toggles connected to adjacent ends of brake shoes have been used. While there has been found merit in both types of devices, it is among the objects of my invention to provide a spreading means which may be mounted on a fixed axis and which will move either end of the friction element to any desired distance while the other end remains stationary or even moves in the same direction. Other objects involve providing adjustment between the expanding device and the ends of the shoe. Another object is to provide connections between the ends of the shoe and the expansion device.

Other objects will appear from the following detailed description of the embodiment of my invention illustrated in the accompanying drawings. The essential characteristics are summarized in the claims.

Figure 1:
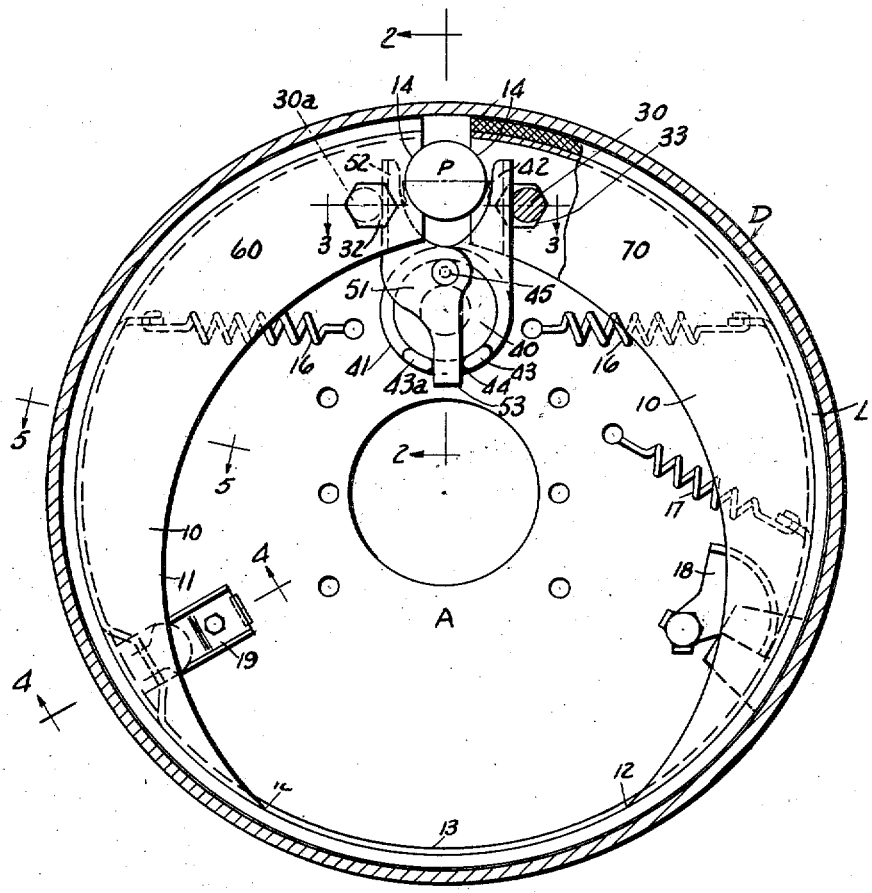
Figure 2:
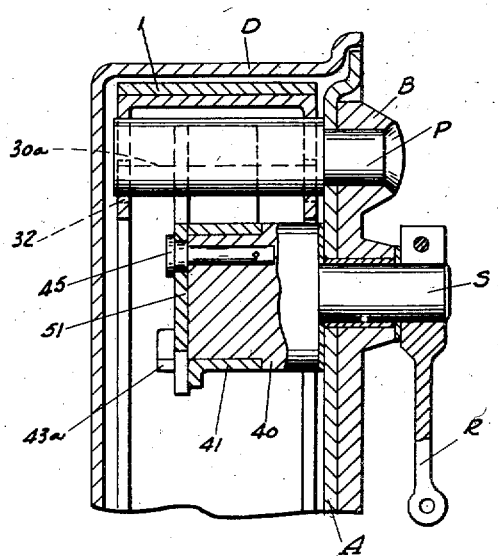
Figure 3:
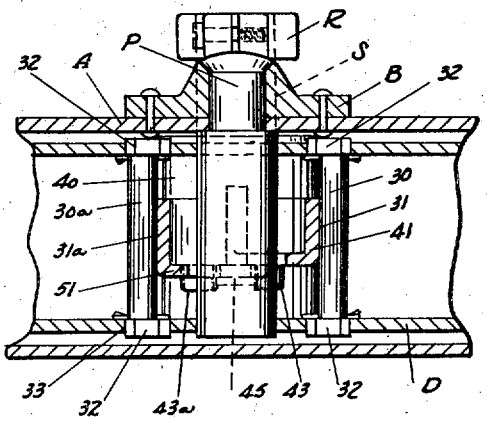
Figure 4:
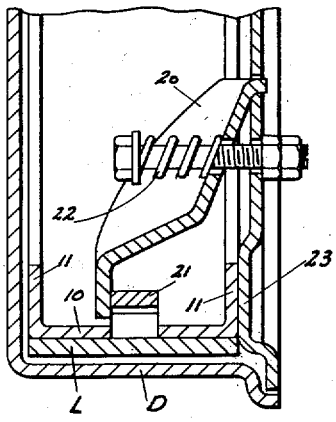
Figure 5:
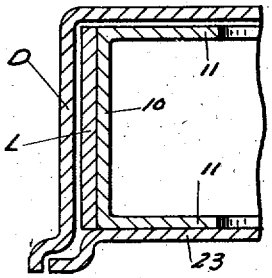

In the drawings Fig. 1 illustrates an elevation of the brake assembly; Fig. 2 is a section taken along the lines 2—2 of Fig. 1; Fig. 3 is a section taken along the lines 3—3 of Fig. 1; Fig. 4 is a section taken along the lines 4—4 of Fig. 1, and Fig. 5 is a section taken along the line 5—5 of Fig. 1.

Referring to the drawings, a back plate or apron A is carried by the axle or knuckle not shown and carries a bracket B (see also Fig. 2) which in turn carries an anchor pin P. Journalled in the bracket is a shaft S to which an arm R is fixed and through which arm the shaft S may be rotated by brake operating means not shown. The usual rotatable brake drum D is intended to be fixed to a wheel, not shown. In this embodiment of my invention, I illustrate a substantially annular brake shoe 10 which may be channeled in cross section in part having inwardly extending side flanges 11 (see Fig. 5). I prefer that the side flanges be deepest at the ends of the shoe and decrease in depth toward the mid-portion to points 12. The mid-portion 13 of the shoe is formed in a flat curved lining supporting part of relatively great flexibility. The degree of flexibility of the channeled portions of the shoe may be relatively small but they may have within themselves a degree of flexibility depending upon the depth of the channel. The ends of the shoes having inwardly extending side flanges which are cut away to form arcuate bearing portions, engage the anchor pin as at 14. Thus, when either end of the shoe is forced away from the anchor depending on the direction of drum rotation, the other end may swing about the anchor pin into engagement with the drum, but because of the relatively slight flexibility of the end portions of the shoes, the wrapping effect of the brake will be limited, and grabbing will be avoided. In other words, the maximum unit pressure between the lining of the shoe can be kept within desired limits and the area of greater pressure can be extended from a point spaced away from the anchor around through the channeled portion of the shoe. Suitable brake lining L may be carried by the shoe. Main retractor springs 16 are provided as shown and an auxiliary retractor spring 17 is used to draw one portion of the shoe against an adjustable stop member 18.

Located in a position complementary to the stop member 18, I provide an anti-rattling device 19, illustrated in greater detail in Fig. 4. The device may comprise a member 20 extending in part through the apron and engaging a piece of the shoe 21 which has been pressed inwardly. An adjustable bolt with a spring 22 acting through the member 20 urges the shoe against a raised portion of the apron 23.

Carried by the side flanges of the shoe, adjacent the ends thereof are pins 30 and 30*a* which may be similar to each other and which are engaged by the spreading device as at 31 and 31*a*. These pins may be freely rotatable if desired, but for the sake of simplicity of illustration, I have shown them as being provided with hexagonal heads 32. The pins are restrained from lateral movement by suitable means such as cotter pins as shown. The side flanges of the shoes have aligned hexagonal openings as at 33 (see also Fig. 1) in which the hexagonal heads of the ends are fitted. To effect adjustment between the expansion device and ends of the shoe, the relative position of the heads of the pins may be changed in the openings in the side flanges of the shoes so that the center of either or both of the pins may be moved toward or away from the end of the shoe. As shown in Figs. 1 and 3, the pins 30 and 30a are in the position most remote from the ends of the shoe and either or both of the pins may be moved nearer their respective shoe ends by changing the position of the heads 32 in the openings 33. While I have illustrated hexagonal heads for the pins, it is of course to be understood that any polyangular head or eccentric head might be used in this connection.

Referring particularly to Figs. 1, 2 and 3, the expansion device may be described as follows: The shaft S has been referred to as being journalled in the bracket B and rotatable by brake operating connections through the arm R. Formed integrally and coaxially with the shaft S is a cylindrical member 40, which I have illustrated as being of substantially greater diameter than the shaft. Freely journalled on the cylinder 40 is a member 41 which preferably encircles the cylindrical member 40 and has an upwardly extending arm 42. The arm 42 extends between the anchor pin P and the pin 30 (see also Fig. 3) and contacts with the pin 30 as at 31, as mentioned above. The member 40 in addition to having the upwardly extending arm 42 has a pair of outwardly extending lugs 43 and 43a which are spaced apart as at 44 and positioned generally diametrically opposite the arm 42. Referring particularly to Figs. 1 and 2, another member 51 is carried by the cylinder and this member is pivotally mounted eccentrically of the axis of the cylinder by such means as a pin 45. The member 51 also has an upwardly extending arm 52 which passes between the anchor and the pin 30a (see also Fig. 3) and contacts with the pins 30a as at 31a. The member 51 has in addition to the upwardly extending arm 52, a downwardly extending arm 53, which may lie over the end face of the cylinder and pass between the lugs 43 and 43a of the member 42 in the space indicated at 44.

The operation of the expanding device is as follows: Assuming the rotation of the drum to be counter-clockwise, which, according to the illustration of Fig. 1, follows from the usual forward movement of the vehicle, it will be desirable to obtain a servo effect, to move the end of the shoe indicated at 60 into engagement with the drum and to retain on the anchor the end 70 of the shoe. To effect this, the shaft S and the cylinder 40 are turned in a counter-clockwise direction, as viewed in Fig. 1 so that the pin 45 is carried counter-clockwise. Counter-clockwise movement of the pin 45 tends to shift the member 51 bodily to the left as viewed in Fig. 1, exerting a pressure on both the pin 30 and the lug 43a. The pressure on the pin 30a tends to move the end 60 of the shoe into engagement with the drum, while pressure on the lug 43a tends to rotate the member 41 in a clockwise direction so that the arm 42 of the member 41 exerts a pressure on the pin 30. The relation of the forces exerted is a matter of proportion and design, but in the embodiment shown herewith and in the instance now described, the rotation of the drum tends to carry the shoe in a counter-clockwise direction to force the end 70 of the shoe upon the anchor and to hold the pin 30 in fixed relation relative to the anchor pin so that the lug 43a is not moved and that all of the motion of the pin 45 is transmitted to movement of the pin 30a.

If the rotation of the drum be clockwise by reason of the vehicle moving in a reverse direction then the operation of the expanding device is similar, but different in the following regards: The rotation of the shaft S is the same and the pin 45 moves in a counter-clockwise direction from its position of rest, but in this instance the end 60 of the shoe is forced against the anchor by the rotation of the drum so that regardless of the initial and preliminary motion, the pin 30 is held in a fixed position with relation to the anchor pin. This counter-clockwise movement of the pin 45 is transmitted to clockwise movement of the lug 43a about the cylinder 40 which causes the arm 42 of the member 41 to move to the right as viewed in Fig. 1, forcing the end 70 of the shoe into engagement with the drum.

It will be seen from the foregoing that the shoe expanding device illustrated and described gives a "full floating" spreading action in that either end of the shoe may be moved from the anchor while the other end remains in engagement therewith. As the lining wears, compensation may be had by repositioning either or both of the pins 30 and 30a as described above. The simplicity of the device and ruggedness of the structure assure long life and dependable service, and while I have illustrated and described a preferred embodiment of my invention, I do not care to be limited in the scope thereof other than by the claims appended hereto.

I claim:

1. Shoe expanding mechanism for a brake, comprising a rotatable cylinder, a member pivotally and eccentrically mounted on said cylinder, a second member pivotally and concentrically mounted on said cylinder, each of said members having arms extending away from the cylinder and engaging the ends of the shoe, said members engaging each other whereby rotation of said cylinder spreads said arms.

2. Shoe expanding mechanism for a brake, comprising a rotatable cylindrical part, a member carried by said part on a pivot whose axis is above and eccentric to the axis of said part, a second member pivotally mounted to rotate about the cylindrical part, each of said members having arms extending above and away from the cylinder and engaging the ends of the shoe, said members also engaging each other below the axis of the cylindrical part whereby rotation of said cylinder spreads said arms.

3. Shoe expanding mechanism for a brake, including a member rotatable on a fixed axis, a second member rotatable about the same axis, and a third member rotating about an axis spaced from the first axis and engaging the second member at a point beyond the first axis and remote from the second axis whereby rotation of the first member causes the movement in opposite directions of parts of the second and third members.

4. Shoe expanding mechanism for a brake, including a member rotatable on a fixed axis, a second member rotatable about the same axis, and a third member rotating about an axis spaced from and above the first axis and engaging the second member at a point beyond and below the first axis and remote from the second axis whereby rotation of the first member causes rotational movement of the second and third members.

5. A brake having an anchor pin, friction means having ends anchorable against said pin, a rotatable shaft, a member concentrically mounted on said shaft for moving one end of said friction means away from said anchor pin, and a member eccentrically mounted on the said shaft and engaging the other end of said friction means and said concentrically mounted member.

6. A brake having an anchor pin, friction means having ends anchorable against said pin, means for moving one end of said friction means away from said anchor pin including a member rotatable about a fixed axis, a second member eccentrically mounted on the first member and engaging the end of said friction means, and means engaging both said members and the other end of said friction means.

7. A brake including an anchor, friction means having ends engaging said anchor, and means for spreading the ends of said friction means including a rotatable shaft parallel to the anchor pin and adjacent thereto, a member carried by the shaft and rotatable concentric therewith, and a second member carried by the shaft and rotatable eccentrically thereof, and engaging the first member.

8. A brake including an anchor, friction means having ends engaging said anchor, and means for spreading the ends of said friction means including a rotatable shaft parallel to the anchor pin and adjacent thereto and having an enlarged cylindrical part, a member carried by the cylindrical part and rotatable concentric therewith, and a second member pivotally mounted on the end of said cylindrical part and rotatable concentrically thereof and engaging the first member.

9. Shoe spreading means for a brake including a part rotatable about a fixed axis, a member having an arm engageable with one end of the shoe and freely encompassing said part and having a lug extending parallel with the axis of the part and beyond the face thereof, and a second member pivotally mounted on the face of the cylinder at a point removed from the axis of the part and having an arm engageable with the other end of the shoe and having a second arm engaging said lug.

10. Shoe spreading means for a brake including a shaft rotatable about a fixed axis, a member having an arm engageable with one end of the shoe and freely encompassing the shaft and having a lug lying below and extending parallel with the axis of the shaft beyond the end thereof, and a second member pivotally mounted on the end of the shaft above the axis thereof at a point removed from the axis of the cylinder and having an arm engageable with the other end of the shoe and having a second arm engaging said lug.

11. In a brake, the combination of an anchor pin, a shoe having ends engaging said pin, adjustable bearing members associated with the ends of said shoes and means for spreading the ends of said shoes engaging said members and comprising a shaft rotatable about a fixed axis and having two members each engageable with one of said first named members and with one another, one of said last named members mounted concentrically of the shaft and the other mounted eccentrically thereof.

12. In a brake, the combination of an anchor pin, a shoe having ends engaging said pin, adjustable bearing members associated with the ends of said shoes and means for spreading the ends of said shoes engaging said members and comprising a shaft rotatable about a fixed axis and having two members each engageable with one of said first named members, one of said last named members mounted concentrically of the shaft and the other mounted eccentrically thereof above the axis of the shaft and both said members engaging each other below the axis of the shaft.

13. Shoe expanding mechanism for a brake comprising a shaft rotatable about a fixed axis, means concentrically rotatable about said axis, and engaging one end of the shoe, and means eccentrically mounted about said axis and engaging the other end of the shoe and the concentrically rotatable means.

14. In a brake, an apron, a drum, an anchor, a brake shoe having separable ends and a lining supporting flange and a radial web, said web terminating at points intermediate the ends of said shoe to give different characteristics of rigidity and flexibility thereto, and a shoe expanding mechanism for said band comprising a shaft rotatable about a fixed axis, means eccentrically mounted about said axis and engaging one of the ends of said shoe.

15. In a brake, the combination of a brake drum, an apron, a brake shoe having separable ends, a peripheral web and a radial web, said radial web being cut away in that portion of the shoe intermediate the ends to impart varying degrees of flexibility and rigidity to the shoe, and a floating device for spreading said shoe comprising a rotatable shaft, a member rotatable with said shaft, means operatively connecting said shaft with said shoe ends to separate said ends, said forces being unequal as applied to said ends whereby one of said ends will be moved before the other.

16. A brake comprising, in combination, friction means having parts separable to apply the brake, a rotatable shaft adacent said parts, and members carried by the shaft and moved in opposite directions by said shaft into contact with said parts to apply the brake, said members being relatively movable and being balanced against each other to balance the forces acting on said parts.

17. A brake comprising, in combination, friction means having parts separable to apply the brake, a rotatable shaft adjacent said parts, and interengaging pivoted devices carried by the shaft and moved in opposite directions by said shaft into contact with said parts to apply the brake.

18. A brake-applying device adapted for direct operative engagement with the friction means of a brake, and comprising, in combination, an angularly-movable operating part, and thrust parts independently pivoted on the operating part and the thrusts of which are balanced against each other.

19. A brake applying device adapted for direct operative engagement with the friction means of a brake, and comprising, in combination, an angularly-movable operating part, and thrust parts independently pivoted on the operating part and which are in direct balancing engagement with each other.

20. A brake cam device constructed and arranged to be mounted within a brake and comprising, in combination, a shaft, a head turned by said shaft, and a pair of interengaging thrust members independently pivoted on said head and arranged to operate the friction parts of the brake.

21. An expanding device for an internal expanding brake comprising a member rotatable about a fixed axis and a pair of parts pivotally mounted on said member and connected to interact with each other, each of said parts engaging one end of the friction device whereby rotation of said member spreads the ends of the device from each other.

22. The combination of a brake friction means having movable ends, anchorage means therefor, and means for forcing said ends into engagement with a brake drum including a rotatable member and a pair of arms pivotally mounted on said member, each of said arms engaging one of said ends and said arms engaging each other whereby rotation of said member causes said arms to exert opposed forces on said ends.

23. An expanding device for a full floating internal expanding brake comprising a member rotatable about a fixed axis and a pair of parts pivotally mounted on said member and connected to interact with each other, each of said parts engaging one end of the friction device whereby rotation of said member spreads the ends of the device from each other even if one of the ends is held stationary.

24. The combination of a full floating brake shoe, means for anchoring either end of said shoe, and means for forcing either end of said shoe away from its anchorage and into engagement with the brake drum including a rotatable member and a pair of arms pivotally mounted on said member, each of said arms engaging one end of the shoe and said arms being connected with each other whereby rotation of said member causes both of said arms to exert opposed forces on the ends of the shoe and move one of the ends of the shoe into engagement with the drum, the other end of the shoe imposing the braking torque on the anchor.

JOHN SNEED.